United States Patent [19]

Bortolussi

[11] 4,295,327
[45] Oct. 20, 1981

[54] MAGNETIC SAFETY CLUTCH FOR ROTARY LAWNMOWER

[76] Inventor: Everest J. Bortolussi, 3148 Louisiana Ave. N., Minneapolis, Minn. 55427

[21] Appl. No.: 156,692

[22] Filed: Jun. 5, 1980

[51] Int. Cl.³ .............................................. A01D 75/20
[52] U.S. Cl. ................................ 56/11.3; 56/DIG. 15
[58] Field of Search ............... 56/11.3, 10.2, DIG. 15; 192/18 B

[56] References Cited

U.S. PATENT DOCUMENTS

| | | | |
|---|---|---|---|
| 2,985,992 | 5/1961 | Dowdle | 56/11.3 |
| 3,160,128 | 12/1964 | Heidt | 192/18 B |
| 3,677,377 | 7/1972 | Miller | 192/18 B |
| 3,773,156 | 11/1973 | Nyquist | 56/11.3 |
| 3,841,069 | 10/1974 | Weck | 56/11.3 |
| 3,999,643 | 12/1976 | Jones | 192/18 B |
| 4,044,533 | 8/1977 | Wick | 56/11.3 |
| 4,205,509 | 6/1980 | Miyazawa et al. | 56/11.3 |
| 4,226,313 | 10/1980 | Meldahl et al. | 56/11.3 |

Primary Examiner—Paul J. Hirsch
Attorney, Agent, or Firm—Kinney, Lange, Braddock, Westman and Fairbairn

[57] ABSTRACT

A deadman-type hand switch mounted on a rotary lawnmower handle actuates a magnetically coupled clutch drive to couple the rotary blade to the lawnmower drive shaft. Release of the hand switch removes the magnetic force holding the clutch members together and actuates a mechanical brake to stop the rotation of the blade. Gravity and the brake's action assist in physically decoupling the clutch members.

4 Claims, 4 Drawing Figures

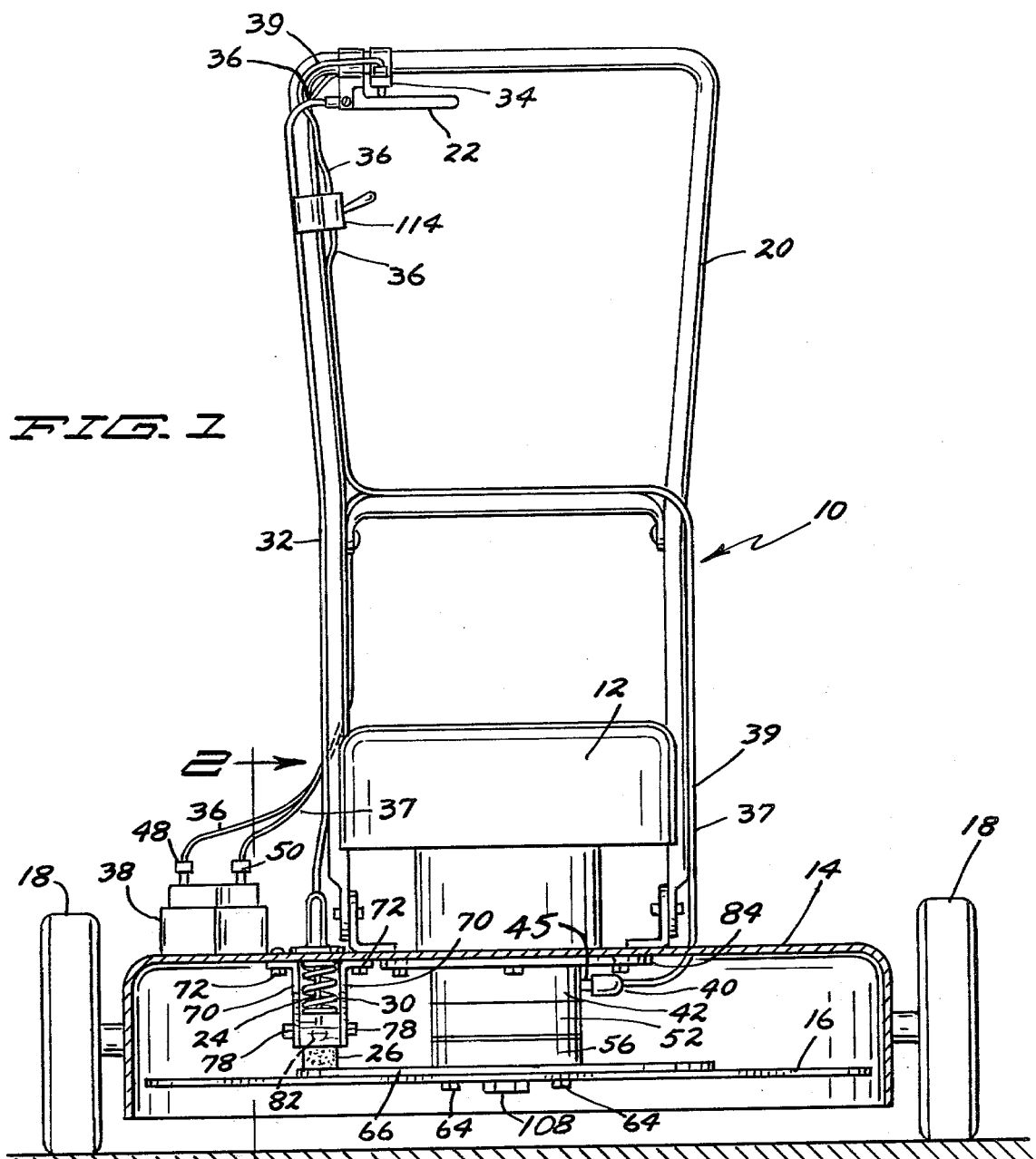
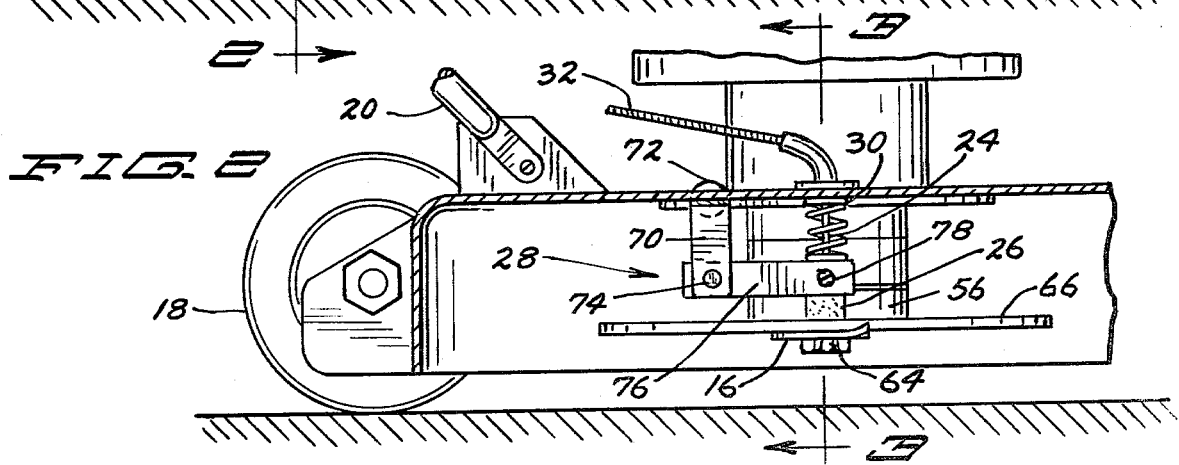

MAGNETIC SAFETY CLUTCH FOR ROTARY LAWNMOWER

BACKGROUND OF THE INVENTION

This invention relates to a rotary lawnmower using a horizontal blade and to a device to couple to rotory blade to the engine only when an operator is present, and to automatically decouple the rotory blade from the engine drive shaft whenever the lawnmower is left unattended with the engine running.

Automatic stop or "deadman" devices have been used in applications where there is a need for continuous operator control of a dangerous instrumentality. The most typical example is with a train locomotive. If the engineer releases his grasp on a control lever, the deadman's device operates both to interrupt drive power from the locomotive's engines and to brake the train to a halt.

In the field of lawnmowers, there is a recognized need for interrupting power to the lawnmower's blades when the operator releases his grasp upon the lawnmower's handle. For instance, the lawnmower operator may wish to clear accumulated grass from under the grass containment hood of the lawnmower. Doing so with the blades continuing to rotate under power is dangerous.

Likewise, an operator of a lawnmower will sometimes have to temporarily leave his lawnmower to do some other errand. However, he may not turn the lawnmower's motor off. But unless he does, the lawnmower operating with its blades rotating under power represents a hazard to children.

A deadman device acts to ameliorate this problem by automatically disrupting power to the blades when the operator releases his grasp of the lawnmower's handle.

The most common automatic shut down device used today is a hand held switch which must be depressed by the operator to keep the engine spark plug from being shorted out. This means that the engine must be restarted even when the operator accidentally releases his grip on the handle switch. Such devices are easily and usually disabled by lawnmower users as soon as they buy the machine.

While other deadman devices have previously included disengageable clutch means, no prior art lawnmower deadman device known to applicant has included magnetically coupled disengageable blade drive means.

A constant hazard in the use of horizontal rotary blade lawnmowers is the damage done by the blade striking stones or other solid objects on the lawn. In addition to this obvious danger of thowing the stone to cause injury or damage to people, animals and/or property hereby; there is often severe damage to the blade and even the motor crankshaft to which the blade has heretofore been rigidly attached.

An example of a structure in which an electromagnetic winding is used to activate a clutch between a drive member and a driven member is shown in the Miller patent, U.S. Pat. No. 3,677,377, issued in July of 1972. This structure does not embody the fail-safe use of gravity to decouple the driven member from the drive member, and does not anticipate the inventive concept of the present invention.

Another example of a magnetic clutching device is seen in the patent of Thomas, U.S. Pat. No. 2,479,986, issued in August of 1949.

A constant and unchangeable friction pressure to couple a lawnmower blade to a drive shaft is shown in the patent of Thelander, U.S. Pat. No. 2,707,362.

The patent to Havercamp et al, U.S. Pat. No. 3,570,226, utilizes the electromagnetic force of the electric lawnmower drive motor to hold a disc brake plate away from a brake lining while the electric lawnmower drive motor is actually rotating. This structure would not be useful to disconnect a lawnmower rotor blade from a lawnmower while the motor was still running.

A search was made prior to the filling of this application, and the above patents as well as the patents listed below aare cited by the searcher. The patents set out below are not believed to be particularly pertinent to the invention:

U.S. Pat. No. 1,012,521 to Coldwell, granted in December of 1911;

U.S. Pat. No. 2,259,824 to Lowder, granted in October of 1941;

U.S. Pat. No. 2,571,762 to Rich et al, granted in October of 1951;

U.S. Pat. No. 3,240,304 to Wickersham; granted in March of 1966;

U.S. Pat. No. 3,417,271 to Reed, granted in December of 1968; and

U.S. Pat. No. 3,774,379 to Mizobata et al, granted in November of 1973.

Neither the inventor nor those in privity with him know of any prior art which is closer than that listed and discussed above. They know of no prior art which anticipates the claims presented herein.

In order to overcome the difficulties discussed above and other difficulties, the structure of the present invention was developed.

SUMMARY OF THE INVENTION

The magnetically actuated safety clutch of the present invention is comprised of the following elements. A normally open switch is closable by the grasp of a lawnmower's operator. The closing of the switch completes an electrical circuit which actuates magnetic flux-producing coils fixedly mounted around the lawnmower's drive shaft. Axially mounted adjacent to these coils is a first magnetic flux-conductor/clutch member. This first clutch member rotates with the drive shaft. Mounted adjacent to the first clutch member is a magnetically attractable second clutch member. The second clutch member is coaxially mounted with the drive shaft, but is freely rotatable with respect thereto. It is also movable longitudinally along the drive axis of the drive shaft. Its travel is limited by the first clutch member and by a limiting means such as a shoulder bolt mounted on the end of the drive shaft. The first clutch member and second clutch member each have facing clutch surfaces which when drawn into contact transmit torque from the drive shaft to the second clutch member. Mounted on the second clutch member is the lawnmower's rotary blade. The second clutch member is drawn into engagement with the first clutch member by magnetic flux produced by the coils. The coils are actuated by an operator grasping the deadman's switch.

As shown, the second clutch member is mounted physically below the first clutch member so that its weight acts to bias it away from the first clutch member.

Also, as shown, a brake disc is mounted to the second clutch member and a normally engaged brake shoe is pivotally mounted to the lawnmower's housing. The same switch which closes the electric circuit to provide magnetic flux when the operator grasps the lawnmower's handle is simultaneously used to withdraw the brake shoe from the brake disc. Also the brake shoe and brake disc are arranged such that the brake shoe is biased in a downward direction toward the brake disc. This adds to the force of gravity as a means of biasing the second clutch member away from the first clutch member upon release of the hand switch by operator.

An "ON-OFF" switch is also provided in the preferred embodiment to selectively enable and disable the electric circuit as an additional safety device so that the magnetically actuated safety clutch cannot be accidentally engaged.

IN THE DRAWINGS

FIG. 1 is a front elevational view of a lawnmower constructed according to a preferred embodiment of the present invention with parts in section and parts broken away;

FIG. 2 is a vertical sectional view taken on the line 2—2 in FIG. 1;

DESCRIPTION OF PREFERRED EMBODIMENT

Figure 3:
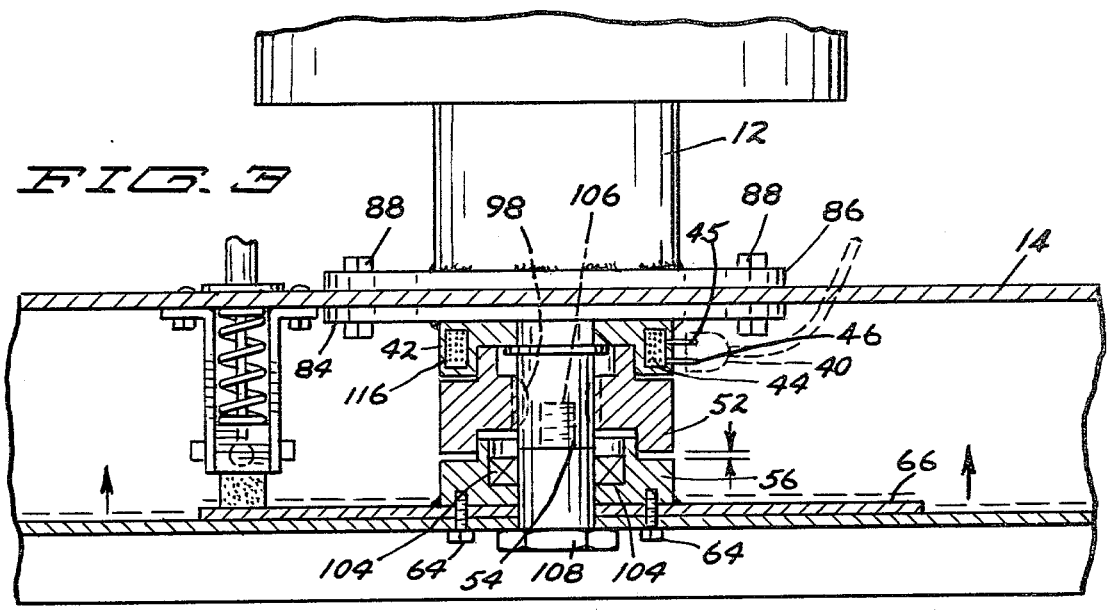
FIG. 3 is an enlarged, fragmentary, vertical sectional view taken on the line 3—3 in FIG. 2.

A lawnmower 10 includes a main frame or housing 14 on which is supported an internal combustion engine 12. This engine has a drive shaft 54 which, typically, is an integral extension of the engine crankshaft.

Wheels 18 are rotatably supported at four corners of the main frame or housing 14. A lawnmower operating and control handle 20 is mounted to the housing as seen in FIGS. 1 and 2.

The above elements constitute a usual rotary lawnmower structure to which the elements of the invention are associated. These elements include a coil housing 42 of electromagnetic material, an adapter plate 84 integral with the coil housing, a reinforcing plate 86, and bolts 88 passing through provided openings in the housing 14 to hold the coil housing 42 in concentric relation to the drive shaft 54. The coil housing 42 is provided with an annular cavity 116 into which is positioned a magnetic flux-producing coil 44. Two leads, 45 and 46, for energizing coil 44 protrude through the housing 42 as best seen to the right in FIGS. 1, 3 and 4.

A first magnetic clutch member 52 is keyed to rotate with the drive shaft 54 through the instrumentality of keys 98 aligning and locking keyways 94 in the drive shaft 54 with keyways 96 in the first clutch member 52. These parts are further locked together through the instrumentality of angularly spaced set screws 100 threadably mounted in the first clutch member 52 into the drive shaft 54. Only one such screw is shown.

A second magnetic clutch member 56 and its roller bearing 104 are freely rotatably mounted on the drive shaft 54 and are slidable longitudinally with respect to the drive shaft from a position as seen in FIG. 3 in clearing relationship to the first clutch plate 52 to position in engaged relationship with that clutch plate (not shown). Movement of the second clutch plate 56 away from first clutch plate 52 is limited by a shoulder bolt 108 which is fastened into the end of the drive shaft 54 by a threaded portion 106 to form an extension of the drive shaft. It is a bolt head 110 of bolt 108 which actually limits downward movement of second clutch plate 56.

Integral with second clutch plate 56 is a brake disc 66. A rotary lawnmower cutter blade 16 is bolted to the second clutch plate and brake disc through the instrumentality of bolts 64,64.

Figure 4:
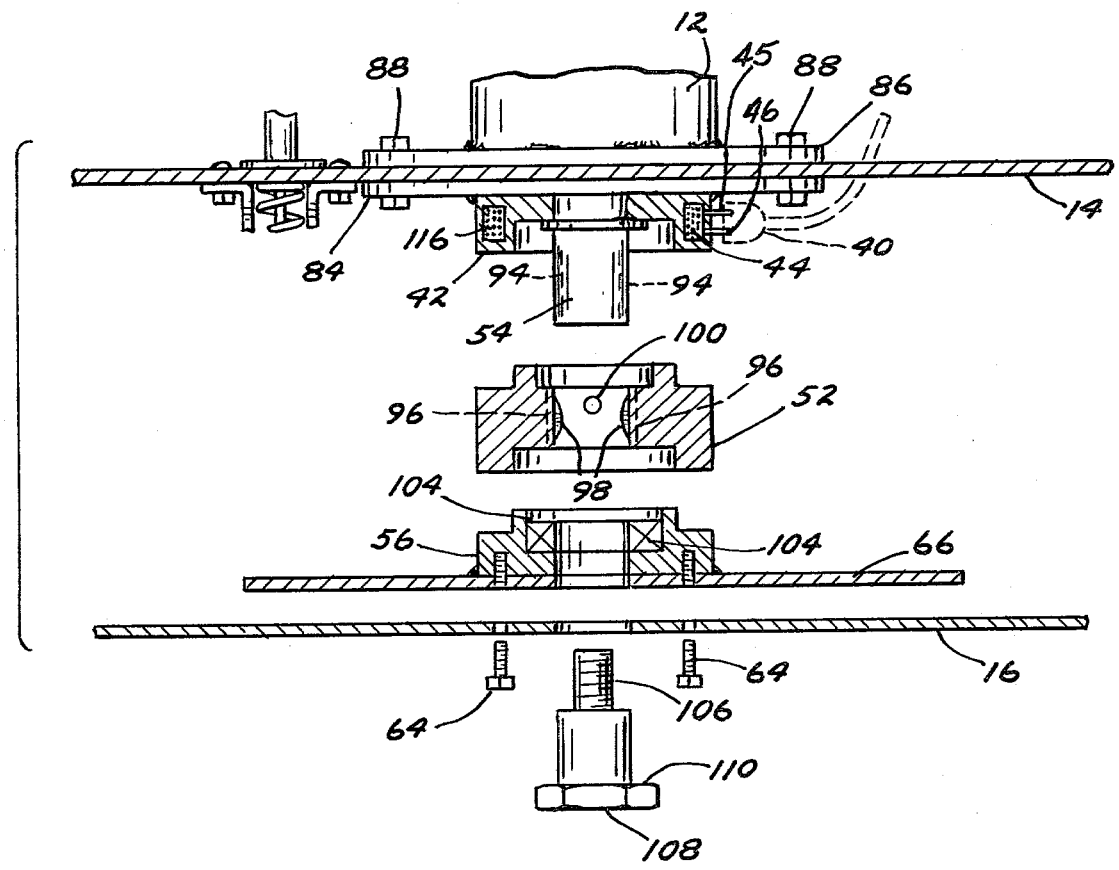
FIG. 4 is an exploded or disassembled view of portions of the structure seen in FIG. 3.

A source of electromotive force for energizing magnetic coil 44, here disclosed as a battery 38 is mounted in an appropriate location on the housing 14, and a first electrical line 36 leads away from a first battery terminal 48 while a second electrical line 37 leads away from a second battery terminal 50. This second electrical line terminates at the female electrical plug 40 which, as shown in FIGS. 1, 3 and 4, can be connected onto the electrical leads 45 and 46 of the magnetic coil 44.

A normally open microswitch 34 is affixed to the upper horizontal portion of the lawnmower operating and control handle 20. First electrical line 36 terminates at one contact of this microswitch, while a third electrical line 39 extends from the other contact of the microswitch 34 to the electrical plug 40. An "ON-OFF" switch 114 is situated in the first electrical line 36 between the microswitch 34 and the battery 38. While shown as a simple toggle switch, it could be a switch similar to a keyed ignition switch, so that the lawnmower blades could only be activated through the use of a key. In any event, with the switch 114 in the "OFF" position, the lawnmower blade 16 cannot be put into driving relationship with respect to the drive shaft 54.

A pivotal lever action hand switch actuator 22 is fastened with respect to the handle 20 in such a manner that the depressing of the switch actuator toward the handle 20 will cause the normally open microswitch 34 to close, thus energizing magnetic coil 44. The magnetic lines of force thus generated and passing through coil housing 42 and rotating first magnetic clutch plate 52, attract second clutch plate 56 causing it to move upwardly to come into driving relationship with respect to the first clutch plate, thus causing lawnmower blade 16 to rotate.

Should the operator have to leave the lawnmower running and unattended even for a matter of a few seconds, he will necessarily release the deadman-type pivotal lever action hand switch actuator 22. Coil 44 will be deenergized, and the lawnmower blade 16, brake disc 66 and second clutch plate 56 will fall away from the first clutch plate 52 by the action of gravity.

When, in the operation of the lawnmower over a lawn, the lawnmower blade 16 encounters a loose stone or other solid object, the sudden reverse torque on the lawnmower blade and consequently on the second magnetic clutch plate 56 will often be so great that the holding force of the clutch plates with respect to each other will be exceeded, and the second clutch plate will slip with respect to the first clutch plate. This is a very important feature, and one which will usually prevent damage to the drive shaft, especially in the situation where, as here, the drive shaft is an extension of the engine crankshaft. Once the rock has been thrown or otherwise cleared, the second clutch plate will again be driven with the first clutch plate.

To aid in bringing the lawnmower blade ripidly to a halt when the magnetic coil 44 is deenergized, a braking assembly 28 is incorporated. This brake system, when activated, puts a downward force component on the outer edge of brake disc 66 and aids the action of gravity in immediately disengaging the second clutch plate from the first clutch plate. The brake also serves to keep the brake disc, second clutch plate and lawnmower blade from having any tendency to rotate at times when the engine is running, the drive shaft is turning, and hand switch 22 has not been depressed.

In addition to the brake disc 66, already described, the braking assembly 28 includes angle brackets 70,70 bolted to the housing 14 as at 72. A pair of pivot arms 76 are pivotally mounted to lower portions of the brackets 70 as at 74. A brake shoe 26 is attached by set screws 78 to the outer end of the pivot arms 76. A brake cable 24 extends from a connection at 82 with brake shoe 26, through a provided opening in the housing 14 and through a flexible cable guide conduit 32 to the pivotal lever action hand switch 22. A biasing means illustrated as a coil spring 30 acts between the housing 14 and the brake shoe 26 to tend to urge the brake shoe down into contact with the brake disc 66.

The connection between the hand switch actuator 22 and the brake cable 24 is such that the cable is drawn toward the hand switch when the switch actuator is depressed toward the handle 20, thus raising the brake shoe 26 from its contact with the brake disc 66.

As soon as the hand switch actuator 22 is released, and even as the magnetic lines of force due to the magnetic coil 44 are collapsing, the brake cable 24 and the brake shoe 26 will be moved downwardly by the coil spring 30 to bring the brake shoe into contact with the brake plate 66, thus rapidly bringing the brake disc and the lawnmower blade 16 to rest.

The embodiments of the invention in which an exclusive property or privilege is claimed are defined as follows:

1. A magnetic safety clutch apparatus for use with a rotary lawnmower having a main frame, a prime mover mounted on said frame, a prime mover drive shaft extending downwardly of said main frame, a rotary lawnmower blade adaped to be rotated by said drive shaft on a vertical axis, and a lawnmower operating handle mounted to a said main frame, said apparatus including:
   A. a source of electromotive force on said frame;
   B. a magnetic flux-producing coil fixedly mounted to said main frame in concentric, surrounding relation to said drive shaft;
   C. a housing of electromagnetic material encompassing said coil;
   D. a first magnetic clutch plate fixed to said drive shaft to rotate therewith and situated in close relationship to said coil housing to provide a low reluctance path between said first clutch plate and said housing;
   E. a second magnetic clutch plate mounted to rotate with said blade and freely rotatably mounted with respect to said drive shaft and movable axially of said drive shaft between an engaged, drive transmitting, position and an unengaged position with respect to said first clutch plate;
   F. means to limit axial movement of said second clutch plate to retain it within the effective magnetic field of said coil when energized;
   G. a lever action hand switch mounted to said operating handle to be readily accessible to an operator of said lawnmower, said hand switch being biased to be normally situated in an inoperative condition and being manually movable to and maintainable in an operative condition; and
   H. circuit means including said hand switch, said circuit means being operative to electrically connect said magnetic coil to said source of electromotive force when said hand switch is in its operative condition and to disconnect said coil from said source when said hand switch is in its inoperative condition.

2. The apparatus of claim 1 wherein:
   I. a circular brake disc is concentrically mounted to and above of said lawnmower blade;
   J. a brake shoe is mounted to said frame for movement between a first condition wherein said brake shoe is in braking contact with said brake disc and a second condition wherein said shoe is in clearing relation to said disc;
   K. biasing means on said frame tends to move said brake shoe toward said first condition; and
   L. control means is provided on said frame, said control means being operably associated with said lever action hand switch and said brake shoe and being operative when said hand switch is in its operative condition to maintain said brake shoe in its second condition against the action of said biasing means.

3. The apparatus of claim 1 wherein:
   I. said source of electromotive force a battery mounted on the main frame; and
   J. said hand switch includes a pivotal lever action hand switch actuator pivotally mounted to the lawnmower operating handle and a normally open microswitch mounted on the handle in operative alignment with the actuator.

4. The apparatus of claim 3 wherein:
   K. a circular brake disc is concentrically mounted to and above said lawnmower blade;
   L. a brake shoe is mounted to said frame for movement between a first condition wherein said brake shoe is in braking contact with said brake disc and a second condition wherein said shoe is in clearing relation to said disc;
   M. a resilient member is operative between said frame and said brake shoe tends to move said brake shoe toward said first condition; and
   N. brake cable means between said pivotal lever action hand switch actuator and said brake shoe is operative when said hand switch is in its operative condition to maintain said brake shoe in its second condition against the action of said resilient member.

* * * * *